Sept. 13, 1955 I. HIRSCHLER 2,717,927

DIALLING DEVICE FOR AUTOMATIC TELEPHONE INSTRUMENTS

Filed Feb. 8, 1952 3 Sheets-Sheet 1

INVENTOR:
IVAN HIRSCHLER

BY

ATTORNEY

Inventor:
Ivan Hirschler
by
Attorney

DIALLING DEVICE FOR AUTOMATIC TELEPHONE INSTRUMENTS

INVENTOR:
IVAN HIRSCHLER
BY [signature]
ATTORNEY

United States Patent Office 2,717,927

Patented Sept. 13, 1955

2,717,927

DIALLING DEVICE FOR AUTOMATIC TELEPHONE INSTRUMENTS

Ivan Hirschler, London, England

Application February 8, 1952, Serial No. 270,592

5 Claims. (Cl. 179—90)

This invention relates to dialling devices for automatic telephone instruments the primary object of the invention being to provide such a device which simplifies the manual operations necessary for dialling a telephone number.

The invention comprises a dialling device for automatic telephone instruments wherein operation in one direction of any one of a plurality of keys actuates non-electrical means which establishes a driving connection between an electric motor and dial operating and mechanical tripping means, and the motor then actuates the dial operating and tripping means whereby said driving connection is released when the dial has been rotated a predetermined amount according to the key operated.

A specific form of dialling device according to the invention will now be described with reference to the accompanying drawings in which.

Figures 1, 5:
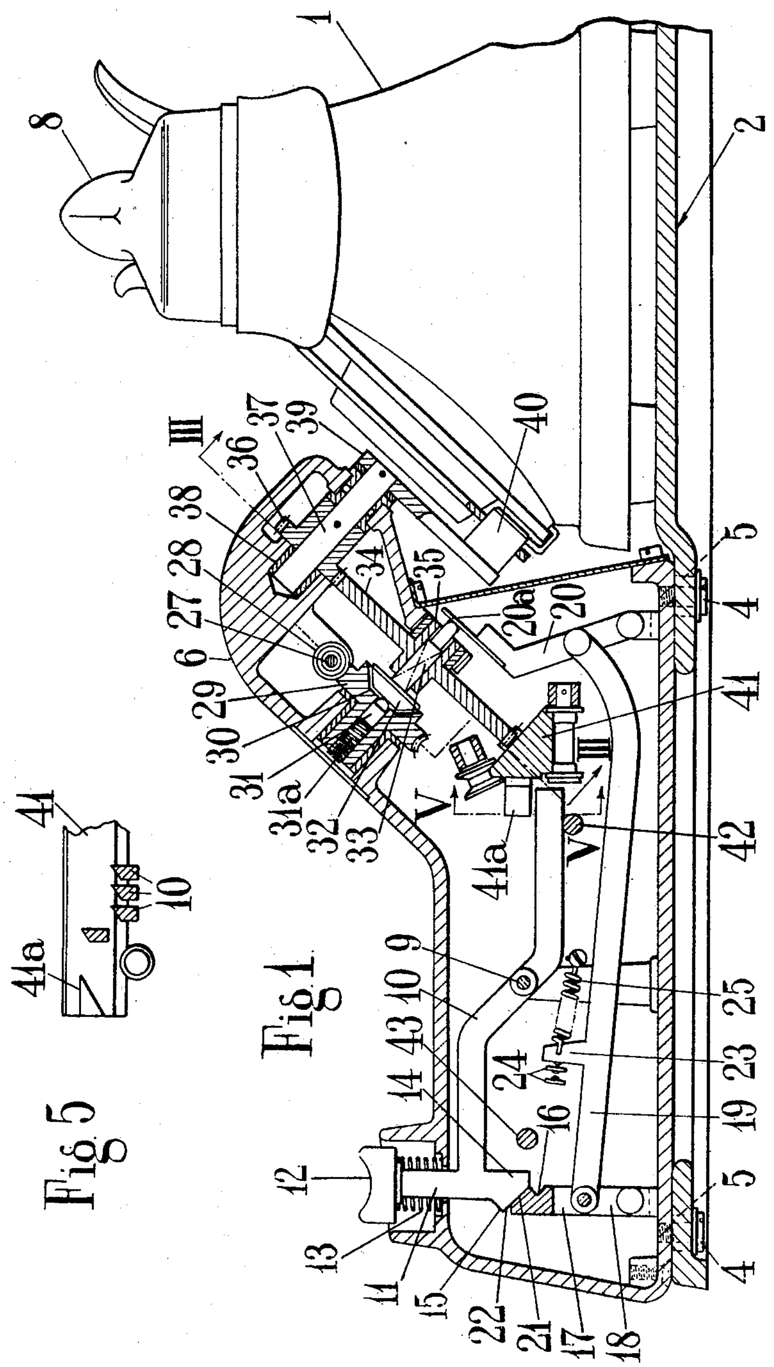
Figure 1 is a sectional side elevation of the device assembled with a telephone instrument, the latter being shown in outside elevation and the section being taken on the line 1—1, Figure 4.
Figure 5 is a sectional end elevation taken on the line V—V, Figure 1.

The telephone instrument 1 is supported on or fixed to a base-plate 2. As shown the telephone is supported on the base-plate 2 and prevented by upslanting back and side flanges 3 from rearward or lateral movement thereon. The base-plate extends forwardly beyond the front of the telephone instrument and supports the dialling device, the latter being secured to the base-plate by screws 4 the shanks of which extend through slots 5 in the base-plate whereby the dialling device can be adjusted to and secured in position as shown in Figure 1, relatively to the telephone instrument for operation of the dial as described hereafter.

The casing 6 of the dialling device has pivoted on one side thereof handset lifting lever 7 having at one end a key for its manual operation, and projecting at its other end beneath the stem of the handset 8 adjacent the earpiece of the latter. The lever 7 is provided with a pivoted locking lever **7*a* whereby the lever 7** can be held in a position to be hereafter referred to.

Pivotally mounted in the casing for movement about the axis of a horizontal spindle 9 are a plurality of key levers 10. Each lever is pivoted intermediate its ends and has at one end an upward extension 11, which projects through and above the upper wall of the casing and carries at the upper end a key 12, whereby the levers can be manually depressed. Springs 13 urge the levers to the position shown in Figure 1. Each lever also has a downward extension 14, provided with a forwardly projecting V-shaped portion 15 adapted to engage in a notch 16, in a universal bar 17 which is pivoted by the lower ends of arms 18 to the casing. A link 19 connects one of the arms to a clutch cone operating lever 20. The upper end of the universal bar 17 is bevelled at 21 to co-operate with bevels 22 at the lower ends of the downward extensions 14 of the keys and the arm 20 has secured thereto one end of a blade spring **20*a*. Ten key levers are provided numbered and lettered as shown, according to the telephone dial of an automatic General Post Office telephone and the forward ends of the key levers normally engage a stop bar 42 located below the inner ends of the key levers. Depression of the keys is limited by a stop bar 43**.

The link 19 has extending upwardly therefrom a switch operating projection 23 which lies to the rear of a pair of spring contact carrying arms 24 of a switch. A spring 25 normally holds the link 19 in a position in which the switch contacts are "open" and the clutch operating lever is in clutch disengaged position. The spring 25 also holds the arms 18 so that the bevel 21 of the universal bar 17 engages the bevels 22 of the keys.

Within the casing there is secured a fractional horse power electric motor 26, which is connected in circuit with the switch and a source of electric current, for example a battery, not shown. The rotor shaft 27 has fixed thereto a worm 28 which meshes with a worm wheel 29. The lower end of the worm wheel has a conical clutch recess 30 into which projects the lower end of a pin 31 pressed by a spring **31*a* into constant engagement with the upper surface of a clutch cone 32 mounted for axial movement by means of a clutch cone shaft 33 which carries the cone and is supported for sliding but non-rotary movement in the arbor of a toothed gear 34 supported for rotation in a bearing 35 carried by the rear portion of the casing wall. The central portion of the shaft 33 is of square cross section and slidably fits the interior of the arbor of the gear 34. The latter meshes with a toothed pinion 36 secured to spindle 37 rotatably mounted in bearings 38 in the upper portion of the wall of the casing. The spindle has fixed thereto at its lower end, a dial operating member 39 which comprises an arm having an outwardly projecting pin 40** which rotatably fits in the dial aperture which when the telephone instrument is idle overlies the cipher or "0."

The gear wheel 34 also meshes with a toothed rack on a trip bar 41 mounted for longitudinal movement transverse to the casing and which has a forwardly projecting trip projection **41*a* which when the motor has rotated a predetermined amount, according to the key depressed, depresses the inner end of that key lever, which constitutes an abutment, and releases it from engagement with the notch in the universal bar, the key lever being then returned to its normal position by means of the spring 13**.

Tripping of the key lever also restores the clutch and switch operating mechanism to normal position, the clutch cone being moved axially out of engagement with the conical recess in the worm wheel by spring **31*a*, and the spring switch arms being moved to open position, the spring 25 moving the link 19 to the right, Figure 1, and restoring the universal lever 17** to the position shown in that figure.

The operation of the device in dialling one digit of a telephone number will now be described, it being understood that the operations in dialling each of the other digits of a telephone number are similar, subject to the dial being rotated by the motor an amount in accordance with the key depressed.

For the purpose of this description the sequence of operations which follow the depression of the key marked "O" only will be set out. Primarily it will be observed that the keys numbered 2 to 9 also have three letters of the alphabet thereon in accordance with the conventional dial letters for calling the exchange.

Before depressing the key the lifting lever 7 is depressed and locked in depressed position by depression of the locking lever. Depression of the lifting lever raises the handset by pivotal movement of the mouthpiece on the upper surface of the casing of the set and releases the cradle for movement to its upper position, so that the operator will hear the dialling tone as soon as it commences indicating that he can proceed to dial a number by the use of the instrument.

Figure 2:
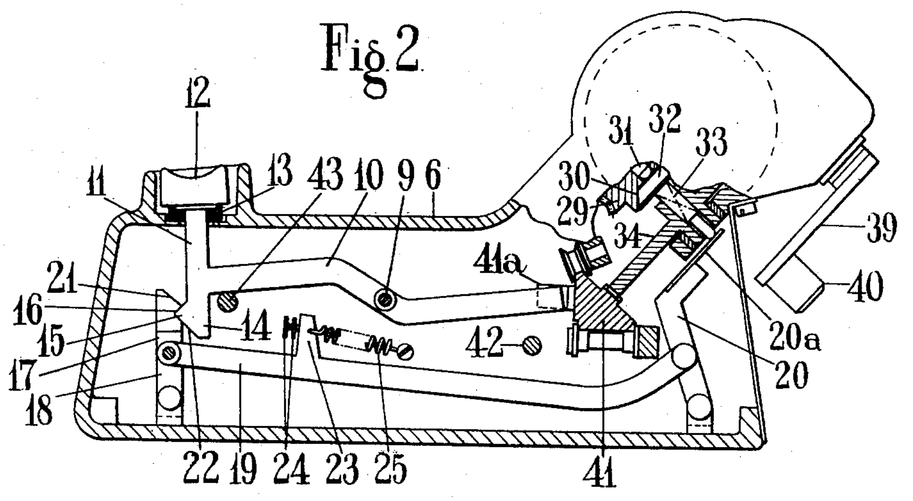
Figure 2 is a side elevation partly in section showing position of certain of the parts when a key has been depressed.
Figure 3:
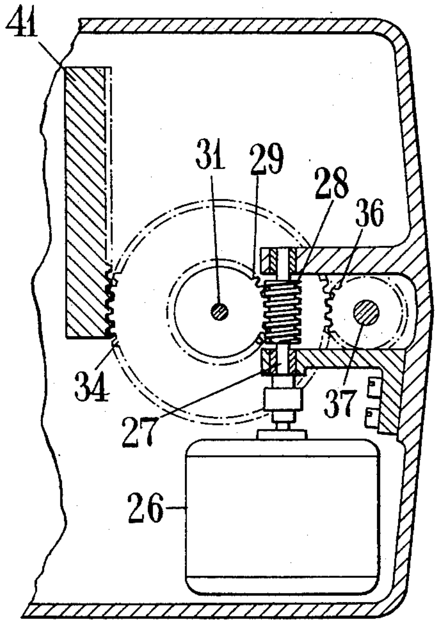
Figure 3 is a sectional plan taken on the line III—III, Figure 1.

During depression of the key marked "O" against the action of its spring 13 until it engages the stop bar, the bevelled lower end 22 of the downward extension 14 acts on the bevel 21 of the universal bar 17 and moves the latter against the action of the spring 25 about the pivotal axis of the arms 18, to the left, Figure 1, until the V projection aligns with the notch when the arms move to the right a shorter distance than said movement to the left, until the V projection registers with the notch as shown in Figure 2. Further during said depression of the key the link 19 is moved first longitudinally to the left, Figure 1, whereby the switch operating projection closes the contacts on the spring switch arms 24 and simultaneously the rotor of the electric motor starts rotating, and rotates the worm 28 and worm wheel 29. The clutch is also engaged by said leftward movement of the link 19, the arm 20 being moved to the left about its pivotal axis so that the blade spring 20*a* moves upwardly and acts on the spindle 32 to force the clutch cone axially into engagement with the conical recess 30, against the action of the spring 31*a*. When the arms 18 move to the right the aforesaid shorter distance, the rightward movement of the link is not sufficient to release the clutch and to open the contacts of the switch, as shown in Figure 2.

With the clutch thus engaged and the contacts in closed position the clutch cone 32 rotates carrying with it the shaft 33 which in turn rotates the toothed gear 34 which rotates the pinion 36 and the spindle 37 and turns the dial operating member and consequently the pin 40 clockwise, thus rotating the dial clockwise. The gear 34 also by its rotation moves the trip bar 41 longitudinally so that the trip projection 41*a* approaches the inner end of the key lever of the key which has been depressed and after the inclined under surface on the projection 41*a* has engaged the inclined upper surface of the inner end of the said key lever, further longitudinal movement of the projection positively depresses the inner end of the key lever, disengaging the V projection from the notch and permitting the key lever to return to normal position under the action of the spring 13. The tripping of the key lever will occur in the particular case of depression of the key marked "O," when the pin 40 engages the stop finger of the dial but in the case of depression of any one of the other keys the tripping will take place when the edge of the corresponding dial aperture to that of the key depressed is in alignment with the adjacent edge of the stop finger as in the case of manual dialling.

Figure 4:
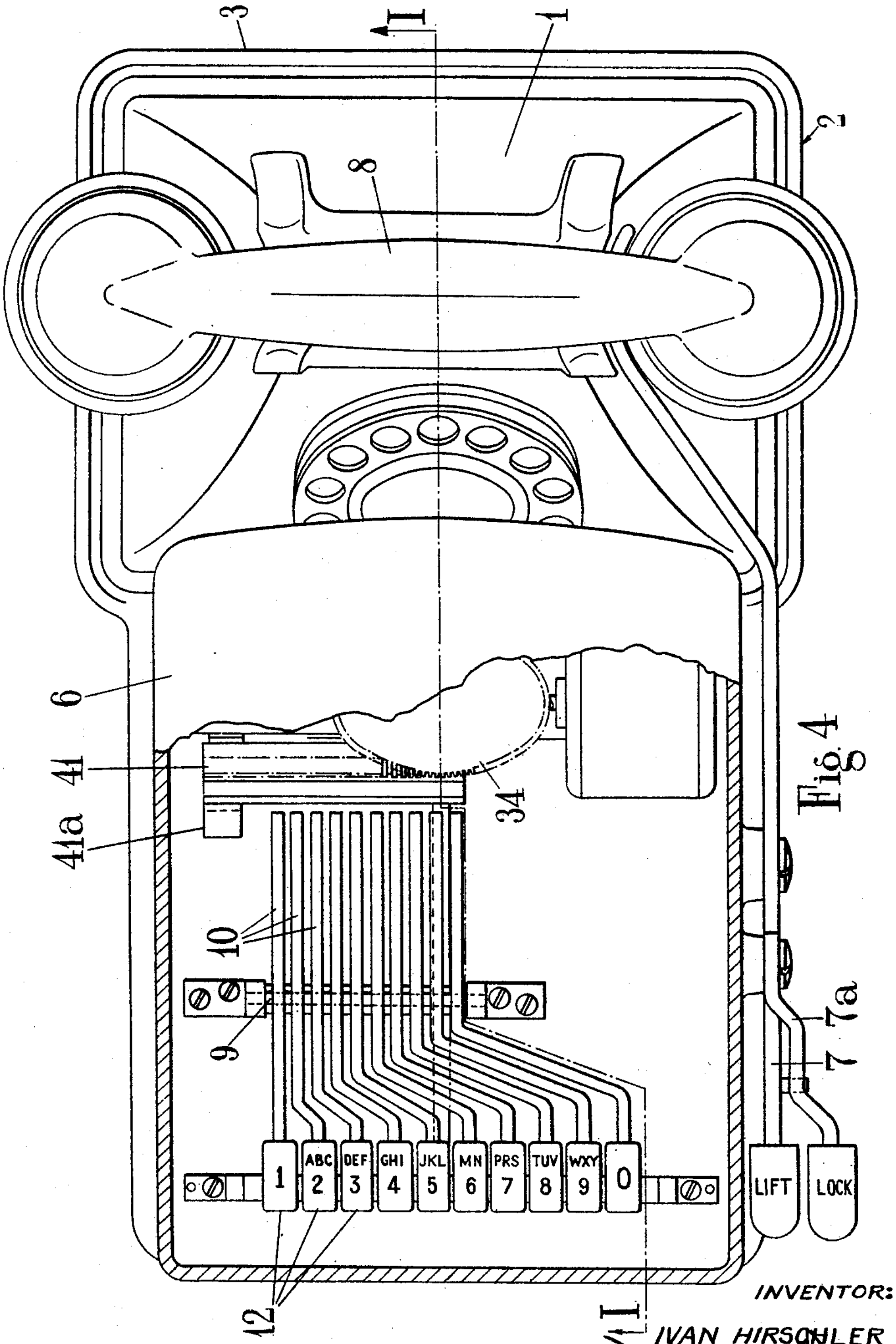
Figure 4 is a plan partly in section of Figure 1.

On the return of the key lever to normal position the switch contacts are opened and the clutch simultaneously released and the telephone dial spring which has been tensioned during the dialling movement of the dial rotates the latter and the dial operating member anticlockwise and the gears move the trip bar to the position shown in Figure 4. If desired an additional spring may be provided to the dial spring in returning the parts to their normal positions and such a spring may associate with the gears 34, 36.

After the user has completed dialling a complete number he will lift the handset and carry on the conversation and before or after replacing the handset on the cradle will release the latter by operation of the locking lever after which the parts will all be in position for reuse.

Although preferable it is not essential that the switch be closed by means actuated by depression of the keys as described, as a manually operable switch may be employed which is independent of said means and conveniently mounted on the casing, for respectively closing and opening the supply circuit to the windings of the motor prior and subsequent to the dialling of a number.

I claim:

1. A device for actuating a rotary dial of an automatic telephone of the type in which the dial is self-restoring to normal position from various dial positions, said device comprising cooperable drive and driven clutch elements normally maintained out of driving connection, means operatively connected to said driven clutch element and engageable with said rotary dial for rotating said dial, a motor operatively connected to the drive clutch element for rotating said driven clutch element in a direction for dialling when the clutch elements are in driving connection, a plurality of selectively-operable depressible key members, resilient means maintaining each key member in normal raised inoperative position, latching means associated with the key members for releasably retaining a key member in depressed operative position upon depression of said key member, a tripping member operatively connected to and movable along a predetermined path of travel by the driven clutch element, an abutment carried by each key member adapted to be disposed in the path of travel of said tripping member in the depressed position of said key member, the abutments of the various key members being located at different distances along the path of travel of said tripping member and each abutment member being displaceable by engagement with the tripping member to release the latching means, and mechanism actuable by movement of each key member to depressed position for connecting said drive and driven clutch elements in driving engagement and for maintaining said clutch elements in driving engagement during the depression of the key member, whereby when the tripping member has traveled a distance determined by the particular key member operated, the tripping member engages the abutment of the depressed key member to release the latching means and restore the key member to raised position and to simultaneously release the driving connection between the clutch elements.

2. A device as set forth in claim 1 wherein the means operatively connecting the motor to the drive clutch element comprises a worm driven by the motor and a worm wheel secured to the drive clutch element and engaging the worm.

3. A device as set forth in claim 1 wherein the means operatively connected to the driven clutch element and engageable with the rotary dial comprises a rotatable spindle, a radial arm fixed to the spindle, a pin upon said arm adapted to fit within an opening of the rotary dial for rotating the dial, a gear mounted upon the driven clutch element, and a pinion fixed to the spindle and meshing with said gear.

4. A device as set forth in claim 1 wherein the tripping member comprises a bar supported for longitudinal movement and provided with rack teeth and a gear mounted upon the driven clutch element meshing with the rack teeth of said bar.

5. A device as set forth in claim 1 wherein the motor is an electric motor and including a normally open switch adapted to be connected in circuit with the motor and with a source of current for energizing and de-energizing the motor, and means operatively connecting said keys and said switch for closing said switch and maintaining said switch closed when a key is in depressed position.

References Cited in the file of this patent

UNITED STATES PATENTS

| | | |
|---|---|---|
| 1,882,106 | Wise | Oct. 11, 1932 |
| 1,927,413 | Morin | Sept. 19, 1933 |
| 2,088,065 | Holden et al. | July 27, 1937 |
| 2,272,089 | La Guardia | Feb. 3, 1942 |
| 2,318,467 | Demeulenaere | May 4, 1943 |
| 2,531,648 | Rovnak | Nov. 28, 1950 |

FOREIGN PATENTS

| | | |
|---|---|---|
| 663,977 | Great Britain | Jan. 2, 1952 |